United States Patent [19]
Kishi et al.

[11] Patent Number: 5,702,748
[45] Date of Patent: Dec. 30, 1997

[54] METHOD OF WET PEELING FOR BREWER'S SPENT GRAIN

[76] Inventors: Sohtaroh Kishi; Yoshio Shiba, both of c/o Kirin Beer Kabushiki Kaisha, 26-1, Jingumae 6-Chome, Shibuyu-Ku, Tokyo-To, Japan; Hidekazu Miyake, c/o Kabushiki Kaisha Miyake Seisakusho, 5-6-9, Mitejima, Nishi-Yodogawa-Ku, Osaka-Shi, Osaka-fu, Japan; Wilhelm Kuenzel, c/o Wilhelm Kuenzel Muehlenbau und Maschinenfabrik, Industriestrasse 7, Mainleus, Bayern, Germany

[21] Appl. No.: 506,803

[22] Filed: Jul. 25, 1995

[30] Foreign Application Priority Data

Jul. 26, 1994 [JP] Japan ................... 6-174563

[51] Int. Cl.⁶ .............. A23J 3/14; A23K 1/06; A23P 1/00
[52] U.S. Cl. .............. 426/478; 426/432; 426/483; 426/624; 426/656; 426/307
[58] Field of Search ............ 426/615, 624, 426/481, 518, 807, 656, 482, 483, 519, 478; 99/602, 612

[56] References Cited

U.S. PATENT DOCUMENTS

| | | | |
|---|---|---|---|
| 122,330 | 1/1872 | Paige | 99/605 |
| 673,995 | 5/1901 | Bardet | 241/7 |
| 2,867,256 | 1/1959 | Earle | 426/482 |
| 4,052,518 | 10/1977 | Borisov et al. | 426/482 |
| 4,377,601 | 3/1983 | Dreese | 426/472 |
| 4,547,382 | 10/1985 | Gannon | 426/482 |
| 4,741,913 | 5/1988 | Satake | 426/483 |
| 4,938,986 | 7/1990 | Zürcher et al. | 426/624 |
| 5,089,282 | 2/1992 | Wellman | 426/483 |
| 5,135,765 | 8/1992 | Kishi | 426/417 |
| 5,156,877 | 10/1992 | Kishi et al. | 426/624 |
| 5,194,287 | 3/1993 | Wellman | 426/622 |
| 5,232,697 | 8/1993 | Bahrani | 424/195.1 |
| 5,361,689 | 11/1994 | Lima et al. | 99/575 |
| 5,505,974 | 4/1996 | Rogers | 426/473 |

FOREIGN PATENT DOCUMENTS

| 3123479 | 5/1991 | Japan. |
|---|---|---|
| 1772 | 2/1890 | United Kingdom. |

OTHER PUBLICATIONS

Hoseney, R.C., Principles of Cereal Science and Technology, American Assoc. of Cereal Chemists, Inc. St. Paul., Minn., 1986.

*Primary Examiner*—Donald E. Czaja
*Assistant Examiner*—Curtis E. Sherrer

[57] ABSTRACT

The present invention relates to an apparatus that achieves improvements in weight recovery ratio and processing capability in the separation of a protein-rich component from brewer's spent grain (BSG), without reducing the protein content in the protein-rich product, and thus makes it possible to reuse BSG as an inexpensive, but superior, protein-rich resource. Brewer's spent grain in a wet state is supplied to a roll mill having a pair of rolls provided with cutting edges and rotating at a predetermined rotational speed ratio, whereby the protein-rich product of the BSG is crushed and peeled from the husk component.

7 Claims, 5 Drawing Sheets

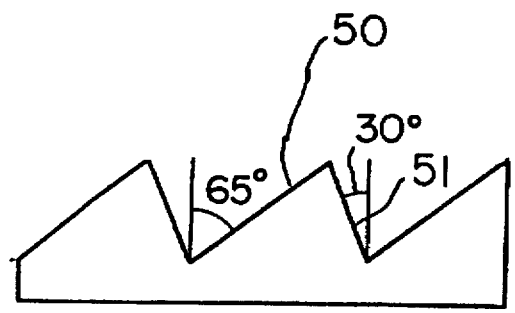
F I G. 3
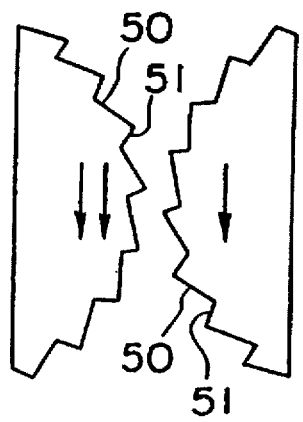
F I G. 4A
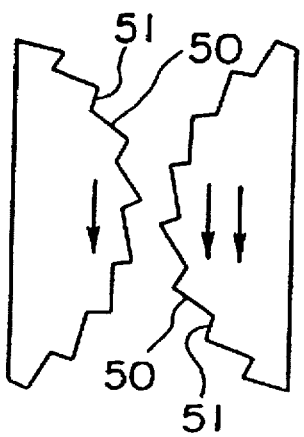
F I G. 4B

METHOD OF WET PEELING FOR BREWER'S SPENT GRAIN

FIELD OF THE INVENTION

The present invention relates to a method of wet-peeling brewer's spent grain (hereinafter called as "BSG") by using a roll mill to mechanically process it, which is capable of greatly improving the ratio of protein-rich product separated from malt husks as well as the processing speed thereof. The present invention also relates to an apparatus for implementing this method.

BACKGROUND OF THE INVENTION

Soybeans and defatted soybeans are the most widely used source of vegetable protein. However, soybeans are produced in limited regions around the world and there is a problem of insufficient supply due to factors such as weather irregularities. Soybean production in Japan is so far from meeting domestic demand, it is necessary to rely on imports. Thus it is desirable to develop a non-soybean protein-rich source that can be supplied stably and inexpensively.

An apparently unrelated problem concerns brewer's spent grain, which is the residue from the mashing (saccharification) of raw material before the brewing of beer. Malted barley mixed with unmalted adjuncts such as rice, corn grits, and cornstarch is used as the raw material for beer. The water-soluble product created by the mashing process is filtered to separate the BSG, which is an insoluble residue, from the wort.

A little less than two-thirds of the protein in the raw material is transferred to the BSG by the mashing process. This means that BSG could be considered to be a high-molecular-weight protein source that has been concentrated by passage through the mashing process, except that the fibers that form the main part of the husks comprise approximately 60% by weight percent of the BSG. In the prior art, this material can only be used as feed for ruminants such as cattle, which can digest such fibers to a certain extent, and thus the range of application of this BSG is restricted.

Since this BSG is a by-product of brewing, in the ratio of 1:4 on a dry matter basis in comparison with the quantity of beer produced, a huge amount of it is produced as the amount of beer increases. In the prior art, there is no use for this surplus BSG, other than reusing it as feed for cattle as described above, in either wet form as is or in a dehydrated or dried form. Thus it cannot be utilized efficiently and has to be incinerated, which adds a fair amount to the processing costs thereof.

If BSG is considered as a protein-rich source, the protein content thereof is low at approximately 25% on a dry matter basis, and thus it is not particularly valuable as a protein source in its present state. Thus it is hoped that it could be possible to broaden the range of application thereof by separating a protein-rich fraction therefrom.

Techniques for increasing the protein content of BSG have been proposed in which dried BSG is pulverized and sieved (such as disclosed in U.S. Pat. Nos. 4,377,601 and 4,547,382). In another known method disclosed in Japanese Laid-Open Patent Publication No. Sho 51-129776, the BSG is extracted at a temperature of 104° C. to 121° C., using an alkaline aqueous solution, then a protein-rich product is precipitated and extracted from the extractant by an isoelectric precipitation method.

The former method has a problem in that the husks in the BSG are pulverized extremely finely and thus it is difficult to separate them from the protein product, so that the protein content of the final product is low at 30% to 40% by weight on a dry matter basis.

The latter method has been criticized because it uses chemical processing. The extraction conditions are alkaline so that decomposition of the proteins occurs. This means that the recovery rate of the proteins drops and also the proteins decompose, and it is also likely that nutritional components essential for the use of BSG as feed are removed and even harmful substances could be created therein.

One of the present inventors have previously proposed in U.S. Pat. Nos. 5,135,765 and 5,156,877 a technique of using mechanical actions to separate a protein-rich product from BSG. This separation method crushes and pulverizes the BSG in a wet state, then sieves the thus obtained pulverized product in the presence of water to separate the protein component therefrom. Thus this method is capable of obtaining a level of protein that is at least 50% (on a dry matter basis), which indicates that it could be used as a protein source as good as, or better, than defatted soybeans.

However, although the separation method of U.S. Pat. No. 5,135,765 described above can produce a product that is 50% protein, the weight recovery ratio thereof ([dry weight of protein-rich component/dry weight of BSG]×100) is low at 22% to 28%, and problems remain concerning the amount of processing required per unit time. Actual experiments have shown that the capability of a roll mill with rolls of a diameter of 200 mm to process BSG is approximately 1.2 kg/m/hr (i.e., converted to give the dry weight per hour per 1 meter of roll length), which makes this method problematical to implement practically on a large scale.

A known method of improving the weight recovery ratio is to narrow the spacing between the rolls of the roll mill. However, although this does increase the weight concentration ratio, the narrowing of the roll spacing causes further problems in that the husks are pulverized and the protein content of the product drops.

SUMMARY OF THE INVENTION

The present invention was devised in the light of the above-described problems with prior-art techniques, and has as its objective the provision of a method of and apparatus for wet-peeling BSG in which the weight concentration ratio and the processing capability are improved, without reducing the protein content in the resultant protein-rich product, to enable the reuse of BSG as an inexpensive, but superior, protein-rich resource.

Wort and BSG with a water content of approximately 70% to 80% are separated from the raw materials for beer, mainly malted barley into which is mixed adjuncts such as rice, corn grits, and cornstarch, by an apparatus for separating solids (BSG) from liquids (wort). Immediately after being separated out, the BSG has a protein content of approximately 25% on a dry matter basis.

A cross-section through a malted barley grain is shown in FIG. 5. The main parts of the barley grain are the endosperm, which mostly consists of starch, and the husk, which consists of fibers, but there is also a layer between the starchy endosperm and the husk that is called the aleurone layer.

Virtually all of the starch contained within the endosperm is decomposed mostly into maltose in wort by the passage through the mashing. Of the proteins in the malt, the parts that are dissolved by the mashing process and transferred to the wort are mainly water-soluble free amino acids and low-molecular-weight peptides that were included in the cells of the endosperm, and the insoluble high-molecular-weight proteins are transferred to the BSG.

An idealized cross-section through BSG is shown in FIG. 6. The starchy endosperm of this BSG dissolves and is removed, leaving only the husk and the aleurone layer. Virtually all of the fibrous material in the husks remains, and the proteins reside in the interior of and on the surface of the aleurone layer as a protein matrix. In other words, the protein in BSG is in a state in which it is concentrated in the aleurone layer. Therefore, if the aleurone layer could be separated from the husk and only the aleurone layer recovered, it would be possible to obtain a substance with a high content of protein.

The present invention makes use of the observation that the physical properties of the husk and aleurone layer are different after mashing, and uses that difference to separate them mechanically. To separate the protein-rich material from the BSG and recover it, the method of the present invention first supplies the BSG to a roll mill, and crushes it therein. This roll mill uses pairs of rolls having cutting edges and with differences in rotational speed. During this crushing process, the rotational speed of the faster roll should be as fast as possible. Experiments with a pilot plant have shown that the maximum speed of the roll mill is preferably on the order of 1000 rpm, and the rotational speed ratio between each pair of rolls is preferably within the range of 2.5:1 to 3.5:1. The spacing of the rolls is preferably within the range of 0.02 mm to 0.06 mm.

A higher weight recovery ratio can be obtained by an "edge-to-edge" relationship between the cutting edges of each pair of rolls and the direction of rotation thereof.

A satisfactory weight recovery ratio could be obtained with only one or two stages of roll pairs, but a train of three stages of roll pairs is preferable for increasing the weight recovery ratio to close to the theoretical limit of approximately 37%. The rotational speed ratios of the pairs of rolls in the second and third stages in such a case could be set to be sequentially less than that of the pair of rolls of the first stage, where those rolls are rotating at a rotational speed ratio within the range of 2.5:1 to 3.5:1.

More specifically, these rotational speed ratios are preferably set such that the first-stage pair of rolls operates at a ratio of 1000 rpm to 330 rpm (a rotational speed ratio of 3:1), the second-stage pair of rolls operates at a ratio of 1000 rpm to 430 rpm (a rotational speed ratio of 2.3:1), and the third-stage pair of rolls operates at a ratio of 1000 rpm to 480 rpm (a rotational speed ratio of 2.1:1). The rotation of each of these roll pairs can be adjusted within a range of ±30 rpm.

After being crushed and peeled, the BSG is supplied to a sieving step to separate out a protein-rich component, a coarse-particle component, and a husk component.

A peeling apparatus of the present invention is provided with a BSG supply means for continuously conveying BSG in a wet state; a roll mill portion provided with a pair of rolls having cutting edges, to which is supplied BSG from the BSG supply means and which rotate at a predetermined rotational speed ratio; and a BSG outlet portion through which processed BSG is led to the outside.

The BSG supply means of this peeling apparatus comprises a hopper, a conveyor for conveying BSG introduced from the hopper, a supply housing for temporarily holding the BSG supplied from the conveyor, and feed rolls provided in a lower portion of the housing for supplying the BSG to the roll mill portion.

When BSG is supplied to the pair of rolls which have cutting edges and are provided with a difference in rotational speed, the action is such that the rolls crush the BSG and, at the same time, the difference in rotational speed generates a shear force that acts to peel the aleurone layer from the husk. Adjusting the moisture content of the wet BSG to a high level or 83% to 90% and also setting the spacing of the rolls to 0.02 mm to 0.06 mm, a far closer range than that employed in a roll mill of this type in the prior art, promotes the peeling of the aleurone layer and improves both the weight recovery ratio and the processing capability of this apparatus.

BRIEF DESCRIPTION OF THE DRAWINGS

FIG. 3 is a view illustrative of cutting edges of the roll mill;

FIG. 4A illustrates an edge-to-edge relationship caused by the cutting edges of the rolls and the difference in rotational direction thereof, whereas FIG. 4B illustrates a back-to-back relationship;

DETAILED DESCRIPTION OF THE PREFERRED EMBODIMENTS

An embodiment of the present invention will be described below with reference to the accompanying drawings.

Figure 1:
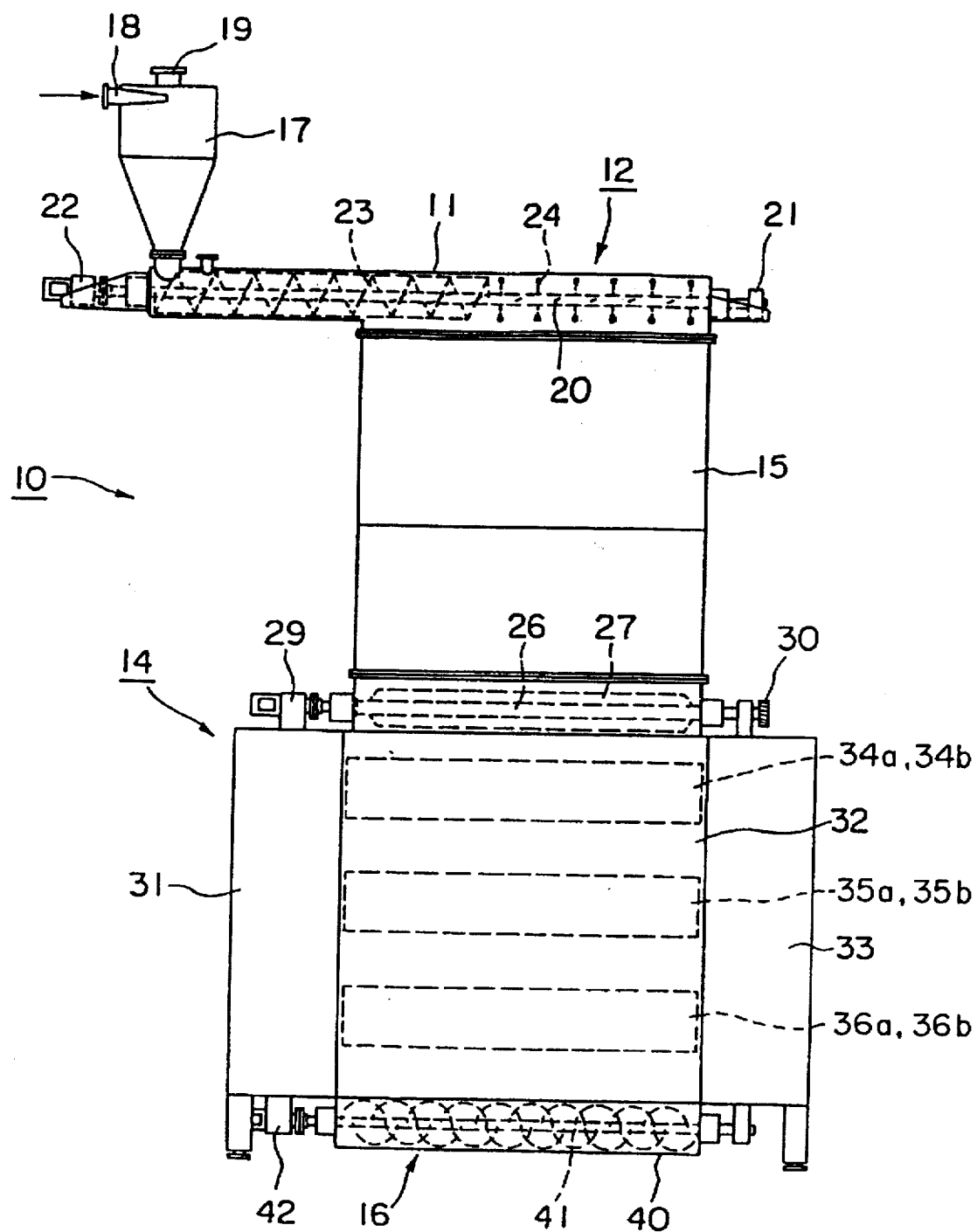
FIG. 1 is a lateral view of an embodiment of a wet peeler for brewer's spent grain (BSG) in accordance with the present invention.
Figure 2:
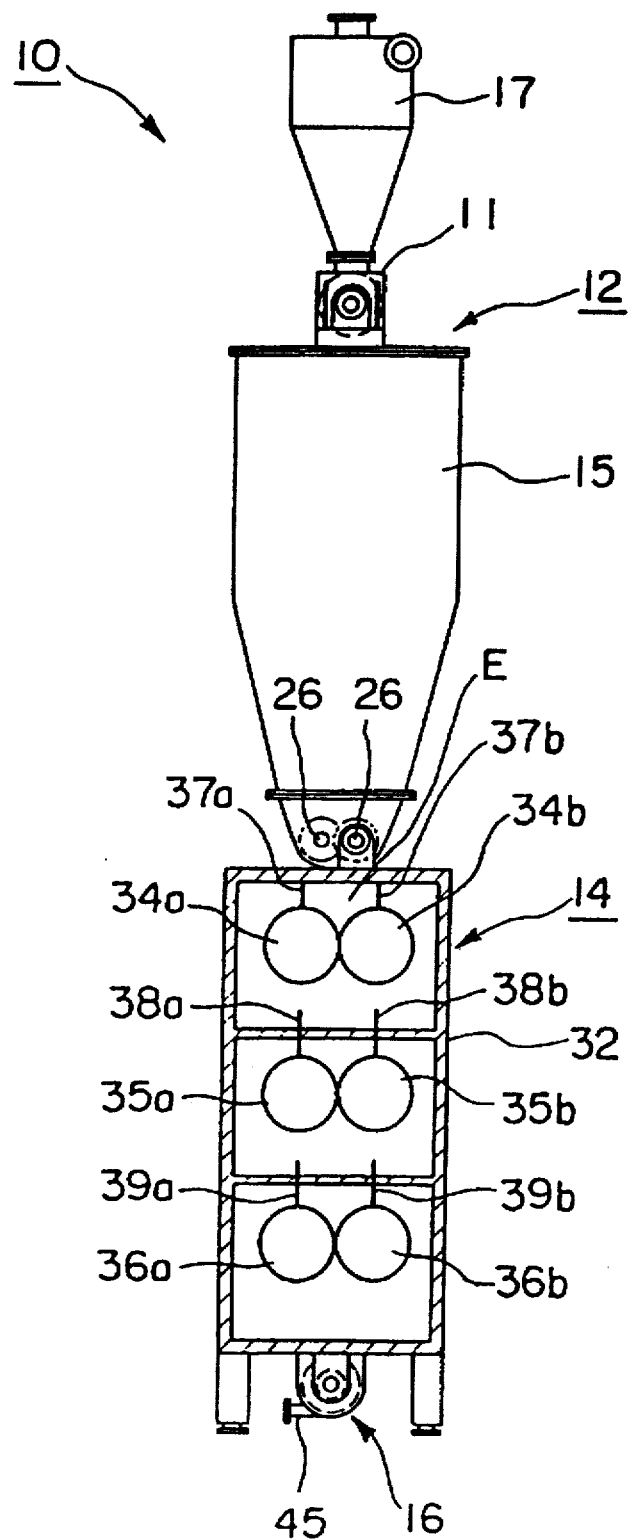
FIG. 2 is a partially cutaway frontal view of the wet peeler for BSG of FIG. 1.
Figure 5:
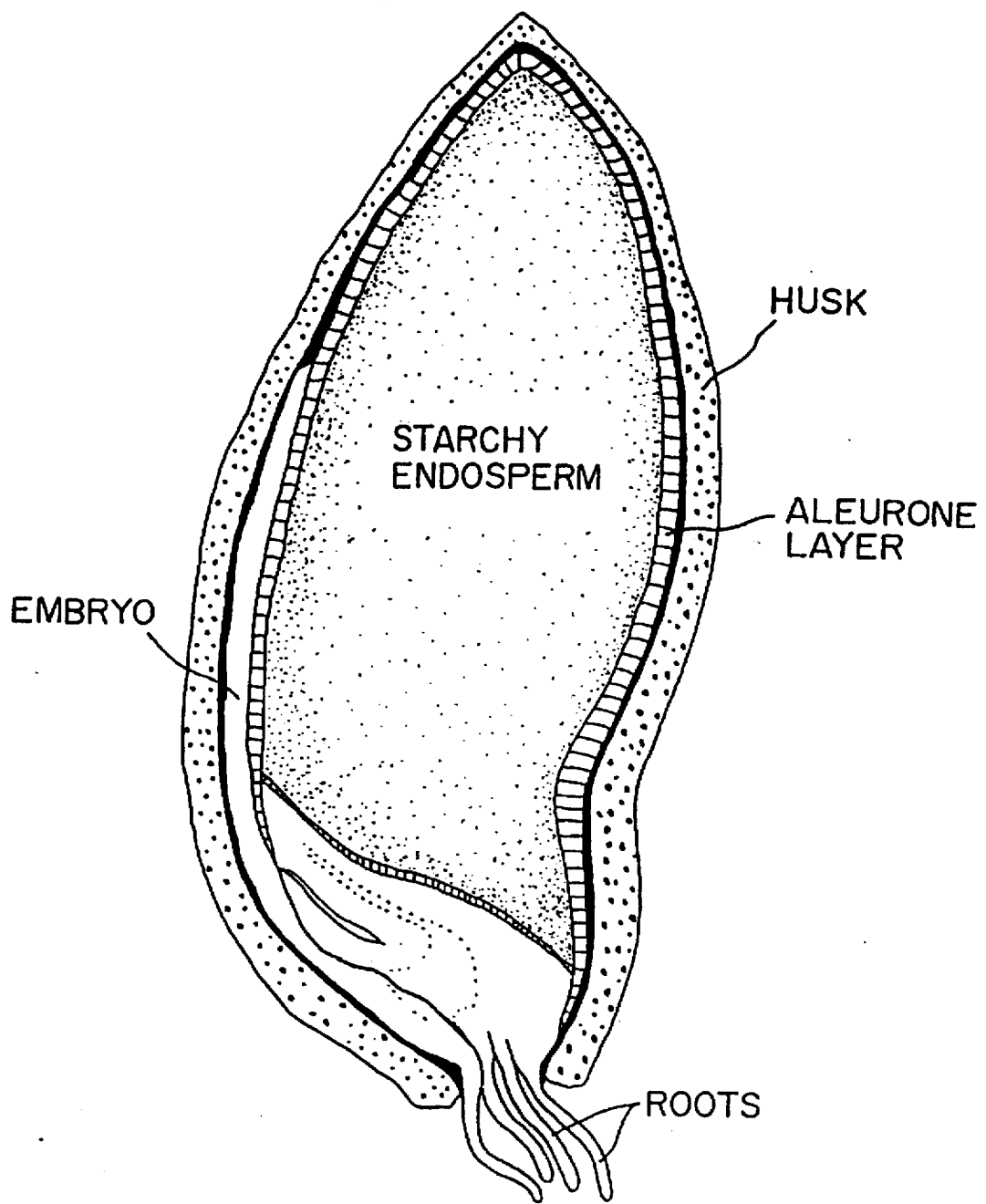
FIG. 5 is a cross-sectional view through a malted barley grain.
Figure 6:
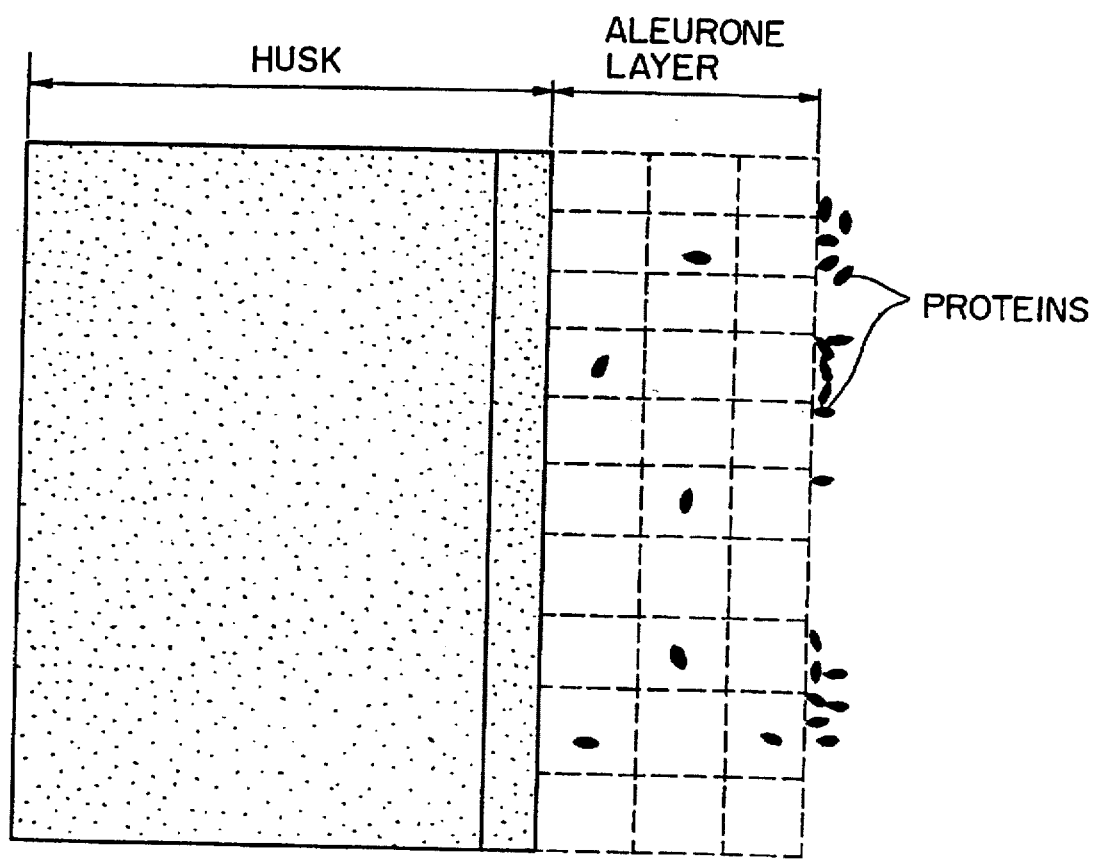
FIG. 6 is an idealized view of the husk and aleurone layer, which is part of the BSG containing the high-molecular-weight proteins.

A lateral view of a wet peeler for brewer's spent grain in accordance with this embodiment of the present invention is shown in FIG. 1, with a partially cutaway frontal view thereof being shown in FIG. 2.

The basic configuration of a wet peeler for BSG 10 of the present invention comprises a BSG supply portion 12 that conveys BSG adjusted with a suitable amount of moisture content and supplies it to a roll mill, a roll mill portion 14 that peels and separates the aleurone layer from the BSG by a plurality of roll pairs arranged in a vertical stack, and an outlet portion 16 that removes the processed BSG.

The BSG supply portion 12 is provided with a housing 11 that forms a conveyor path for the BSG, with a hopper 17 being attached to one end portion of this housing 11. The hopper 17 has a supply aperture 18 for the BSG and a water inlet 19, with the configuration being such that the water and raw BSG supplied to the hopper 17 are adjusted in such a manner that the moisture content thereof is constant.

Within the housing 11 is accommodated means for conveying the BSG while mixing it. In this embodiment, the conveyor means is configured of a helical-screw conveyor 23 and a crossbar screw 24 downstream therefrom. The helical-screw conveyor 23 and crossbar screw 24 have a common rotational shaft 20 that is supported in a freely rotatable manner at one end by a bearing 21 and is also linked at the other end to a motor 22.

On the lower side of this BSG conveyor apparatus is provided a supply housing 15 that temporarily holds the BSG that is supplied thereto in slurry form and also supplies it to the roll mill portion 14.

Side walls of the lower half of this supply housing 15 are inclined in such a manner that the space therebetween narrows toward the downward direction, with the configuration being such that the BSG introduced therein collects at the center thereof.

A base portion of the supply housing 15 is provided with feed rolls 26 for supplying the BSG that has fallen thereto continuously and at a constant rate to the roll mill portion 14.

The feed rolls 26 are configured of a pair of rolls, with the configuration being such that one roll is driven rotatably by a motor 29 and the other roll is driven in synchronization therewith by toothed wheels 30. In this embodiment, the feed rolls 26 are paddle rolls with paddles 27 being attached over the entire rolls in the radial direction and extending in the axial direction. Note, however, that these paddle rolls could equally well by crossbar rolls.

The roll mill portion 14 is provided with three pairs of rolls 34a and 34b, 35a and 35b, and 36a and 36b that set three stages in the vertical direction. These pairs of rolls 34a and 34b, 35a and 35b, and 36a and 36b are completely enclosed in a water-tight housing 32. The interior of this water-tight housing 32 is divided into three stages vertically, with each division thereof accommodating one of the pairs of rolls 34a and 34b, 35a and 35b, and 36a and 36b. The roll spacing of each of these pairs of rolls 34a and 34b, 35a and 35b, and 36a and 36b can be adjusted in 0.01-mm units, and each roll pair can be driven independently at any predetermined rotational speed. Any suitable known means could be provided as mechanisms for adjusting the spacing of these roll pairs and for driving them, within housings 31 and 33 close to the water-tight housing 32.

Guide plates 37a and 37b are provided above the uppermost pair of rolls 34a and 34b, arranged so as to be erected vertically, in parallel with the axial spacing of the rolls. In this case, a BSG holding space E is formed above the pair of rolls 34a and 34b by the guide plates 37a and 37b. The arrangement is such that BSG transferred from the feed rolls 26 is temporarily held in this space, before it is smoothly supplied to the pair of rolls 34a and 34b.

In a similar manner, guide plates 38a and 38b are provided above the middle-stage pair of rolls 35a and 35b, and guide plates 39a and 39b are provided above the lowermost pair of rolls 36a and 36b.

A view of teeth that are cut into the surfaces of these pairs of rolls is shown in FIG. 3.

Each tooth on the rolls in this case is formed of a longer inclined surface 50 and a shorter inclined surface 51 arranged in ridges extending in the axial direction of the rolls as shown in FIG. 3. For a roll mill with rolls of a diameter of 200 mm, teeth could be used wherein the slope of the longer inclined surface 50 is 65° to the radial direction, the slope of the shorter inclined surface 51 is 30° to the radial direction, the height of each tooth is 0.4 mm, and the tooth spacing is 1.1 mm.

Views illustrating the terms "edge-to-edge type" and "back-to-back type" for the relationships between these cutting edges, differentiated by differences in the direction of rotation of each pair of rolls and the speed ratio therebetween, are shown in FIG. 4A and FIG. 4B.

The two rolls of each stage of the mill rotate at different rotational speeds. In this case, if the roll that is rotating with the shorter inclined surfaces 51 facing downward is rotating the faster, this is called edge-to-edge type cutting (FIG. 4A). If the roll that is rotating with the longer inclined surfaces 50 facing downward is rotating the faster, this is called back-to-back type cutting (FIG. 4B). The edge-to-edge relationship emphasizes shearing forces, whereas the back-to-back relationship emphasizes extrusion forces. The apparatus in accordance with the present invention can use either method, but edge-to-edge is preferable from the weight recovery ratio viewpoint.

The BSG that has passed through the lowest-stage pair of rolls 36a and 36b passes through the outlet portion 16 and is ejected to the outside (See FIG. 1 and FIG. 2). A screw conveyor 41 that is driven by a motor 42 is accommodated within a casing 40 of this BSG outlet portion 16, with the configuration being such that the BSG that has been processed by the roll mill portion 14 is led out smoothly to the outside from an outlet portion 45.

The description now turns to the operation of the wet peeler for BSG of the above configuration.

The raw BSG material is introduced, as shown in FIG. 1 and FIG. 2, into the hopper 17 from the supply aperture 18 and is moistened by water supplied from the water inlet 19. This moistening is adjusted to provide a water content within the range of 83% to 90%. Note that this moistening step could also be provided by using compressed air to convey raw material of a water content that has already been adjusted. Alternatively, a cyclone configuration could be used instead in which the BSG and water is blown into the hopper 17 from the peripheral direction.

The BSG is mixed to an appropriate degree by the helical-screw conveyor 23 then is introduced uniformly from the crossbar screw 24 into the supply housing 15. It usually stays within the supply housing 15 for between one to three minutes, then is conveyed into the uppermost pair of rolls 34a and 34b of the roll mill portion 14 by the paddle-shaped feed rolls 26.

Since the guide plates 37a and 37b are arranged above the pair of rolls 34a and 34b to form a space to store the BSG temporarily, the stored BSG is supplied by a pushing motion into the pair of rolls 34a and 34b by the feed rolls 26. The vertically standing guide plates 37a and 37b prevent the formation of a bridge of BSG, thus promoting the crushing and peeling actions of the pair of rolls 34a and 34b.

The BSG that has been processed in this manner by the uppermost pair of rolls is sent on to the middle-stage pair of rolls 35a and 35b then the lowermost pair of rolls 35a and 35b, and is processed thereby. During this time, the storage spaces formed by the guide plates 38a and 38b and guide plates 39a and 39b act to promote the crushing and peeling actions of the roll mill, in the same manner as described above.

The product that has passed through the roll mill portion 14 in the above manner is led to the outside by the screw conveyor 41 of the outlet portion 16, and it is then delivered to a subsequent sieving step.

Note that since the pairs of rolls are accommodated in the water-tight housing 32, the construction is such that the pairs of rolls 34a and 34b, 35a and 35b, and 36a and 36b can easily be washed after the BSG processing has ended by rotating them when the water-tight housing has been filled with washing water.

The effects achieved by the present invention will now be discussed.

Processing was done in a roll mill with rolls of a diameter of 200 mm and at a spacing adjusted to 0.02 mm, with a rotational speed ratio that gave an edge-to-edge relationship. 108 kg of raw BSG (water content: 77.5%, equivalent dry weight: 24.3 Kg) was adjusted to a water content 89.0%, and then was supplied from the hopper by the paddle-shaped feed rolls to the roll mill.

The first-stage pair of rolls was operated at a rotational speed ratio of 1000 rpm to 330 rpm, an intermediate product I was obtained therefrom, this intermediate product I was supplied to the second-stage pair of rolls (rotational speed ratio: 1000 rpm to 430 rpm), and a second intermediate product II was obtained therefrom.

This second intermediate product II was then supplied to the third-stage pair of rolls (rotational speed ratio: 1000 rpm to 480 rpm) to obtain a final product III.

When this final product III was graded using vibrating sieving machine, 8.1 kg of protein-rich component and 16.2 kg of a combination of coarse-particle and husk components (on a dry matter basis) were obtained. Analysis of the amount of protein in the protein-rich component gave a high content of 54.7%.

Thus this embodiment achieves a weight recovery ratio of protein-rich component of 33.3%, which is nine times the processing capability of the prior art.

Note that the method of the present invention was also used to process BSG under similar conditions, but with the roll mill set to rotate in a back-to-back fashion, to give a weight recovery ratio of the protein-rich product of 30.3%.

Note also comparative examples of prior-art smooth-surfaced roll mills (with no cutting edges), with the rolls rotating at a speed of 100 rpm and set to a spacing of 0.1 mm and 0.3 mm, gave weight concentration ratios of 27% and 23%, respectively.

As should be clear from the above description, by supplying BSG to a pair of rolls rotating at different speeds, thus subjecting it to crushing and peeling, the present invention makes it possible to separate a protein-rich substance of at least 50% therefrom, and also dramatically increases both the weight recovery ratio and processing efficiency to levels suitable for practicable use.

What is claimed is:

1. In a method of wet-peeling brewer's spent grain comprising supplying wet brewer's spent grain to a roll mill having at least one pair of rolls which separate the brewer's spent grain into component parts, including a protein-rich product and a husk, and recovering the separated protein-rich product, the improvement wherein each roll of the at least one pair of rolls has a cutting edge, with the cutting edges of respective rolls having a spacing therebetween, wherein the roll mill rotates the at least one pair of rolls at different rotational speeds and at a rotational speed ratio, and wherein the moisture content of the wet brewer's spent grain, the spacing between the rolls and the rotational speed ratio of the rolls are set so as to crush and peel a sufficient amount of an aleurone layer of the grain from the husk such that the protein-rich product contains at least 50% protein and comprises at least 30.3% by weight of the brewer's spent grain.

2. The method of wet-peeling brewer's spent grain according to claim 1, wherein said brewer's spent grain is supplied as a slurry and wherein the moisture content is in the range of 83% to 90% and the spacing between said at least one pair of rolls is between 0.02 mm to 0.06 mm.

3. The method of wet-peeling brewer's spent grain according to claim 1, wherein said rotational speed ratio of said pair of rolls is between 2.5:1 to 3.5:1.

4. The method of wet-peeling brewer's spent grain according to claim 1 wherein a plurality of stages with a pair of rolls in each stage is provided, and wherein a temporary storage space is formed above each pair of rolls in each stage by vertically erected guide portions in such manner that said brewer's spent grain supplied to each pair of rolls of each stage is temporarily held therein.

5. A method of wet-peeling brewer's spent grain according to claim 2, wherein said rotational speed ratio of said pair of rolls is between 2.5:1 to 3.5:1.

6. The method of wet-peeling brewer's spent grain according to claim 2 wherein a plurality of stages with a pair of rolls in each stage is provided, and wherein a temporary storage space is formed above each pair of rolls in each stage by vertically erected guide portions in such manner that said brewer's spent grain supplied to each pair of rolls of each stage is temporarily held therein.

7. The method of wet-peeling brewer's spent grain according to claim 3 wherein a plurality of stages with a pair of rolls in each stage is provided, and wherein a temporary storage space is formed above each pair of rolls in each stage by vertically erected guide portions in such manner that said brewer's spent grain supplied to each pair of rolls of each stage is temporarily held therein.

* * * * *